Feb. 27, 1968   A. E. CAPLAN   3,370,664
MOTORIZED STAIR-CLIMBING SHOPPING CART
Filed Aug. 25, 1966
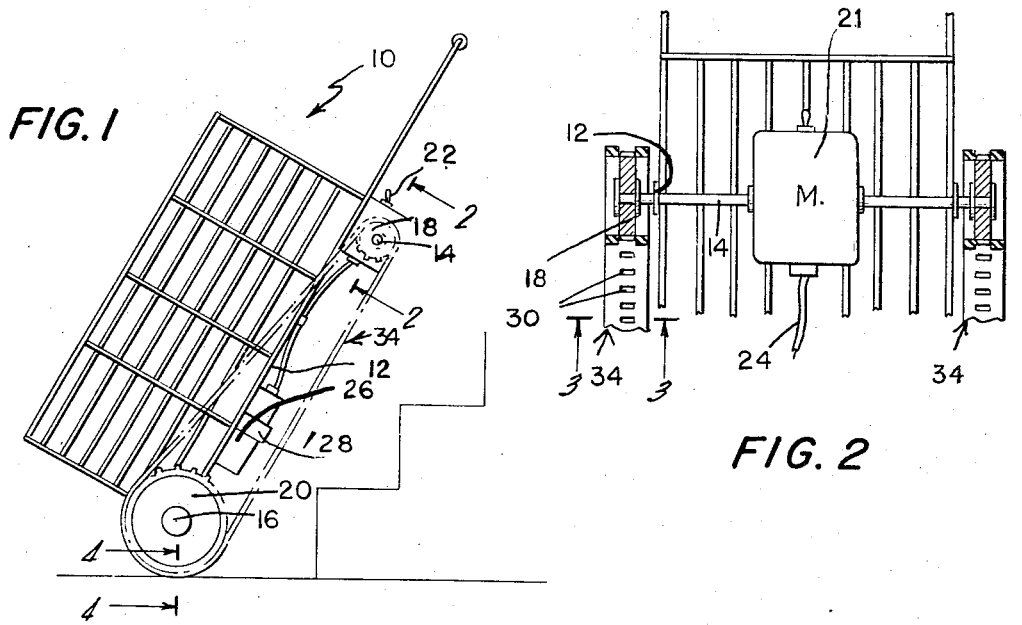
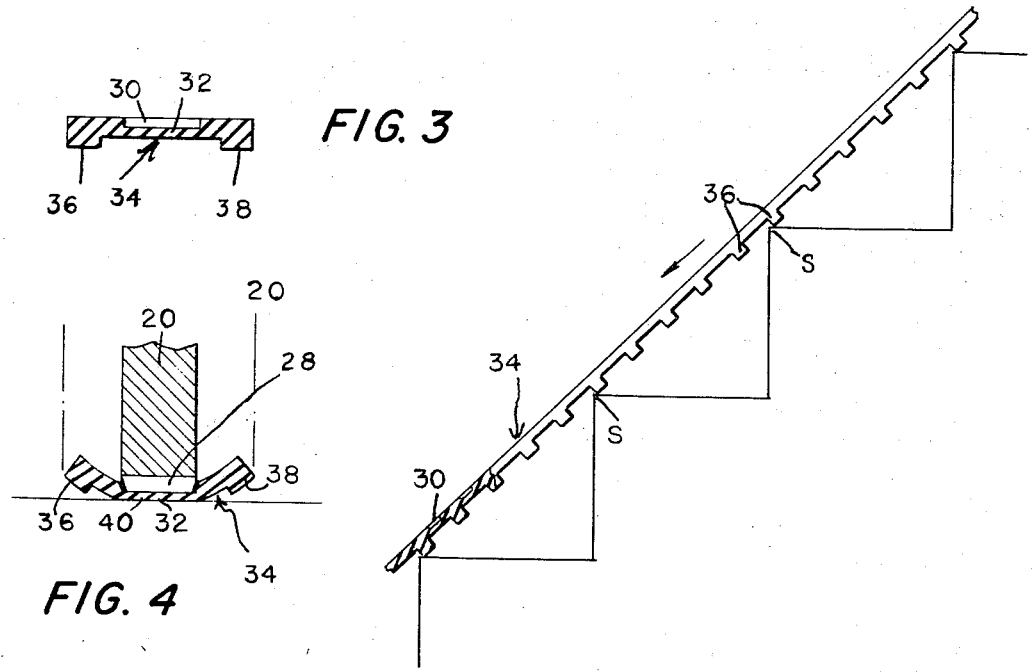
INVENTOR.
ALLEN E. CAPLAN
BY
Briskin & Goldfarb
ATTORNEYS

United States Patent Office 3,370,664
Patented Feb. 27, 1968

3,370,664
MOTORIZED STAIR-CLIMBING SHOPPING CART
Allen E. Caplan, 62—09 84th St.,
Middle Village, N.Y. 11379
Filed Aug. 25, 1966, Ser. No. 575,108
7 Claims. (Cl. 180—9.22)

This invention relates to vehicles in general and more particularly to a motorized stair-climbing cart.

Various types of shopping carts are now being widely used for facilitating the delivery of food and other goods to the home of the user. These shopping carts may be easily propelled along substantially level surfaces, but it is often difficult if not impossible for women and other persons of limited strength to propel, push or pull these carts when loaded up staircases, curbs, and the like.

It is therefore the primary object of the present invention to provide various types of existing shopping carts and newly constructed shopping carts with motorized means for achieving stair-climbing facilities.

The construction of this invention features the use of novel treads which are entrained about sprockets mounted on the axles of a shopping cart. These treads are resilient and flexible and include central portions of reduced cross sectional area and edges provided with rows of spaced detents.

An important concept of the invention is that when the treads are stretched tautly over the sprockets, the detents will be pulled inwardly of the central portion of the treads and toward the center of the sprockets so that only the center of the treads will engage the ground or other surface over which the shopping cart is moving. However, when used for climbing stairs, at locations between the sprockets, the detents will engage the stair edges and provide suitable stair climbing aid in lifting the shopping cart.

A further object of the invention is to provide an attachment for use on existing shopping carts or to be originally installed as part of a newly manufactured shopping cart for rendering the shopping cart more mobile and for propulsion thereof.

Still further objects and features of this invention reside in the provision of a motorized stair-climbing shopping cart that is simple in construction and manufacture, which is capable of being produced for individual purchase by the user or for employment in super-markets, food stores, drug chains and the like, which employs a novel arrangement of treads equally adaptable for various other uses, and which is inexpensive to manufacture, thereby permitting wide use and distribution.

These, together with the various ancillary objects and features of the invention, which will become apparent as the following description proceeds are attained by this motorized stair-climbing shopping cart, illustrated in the accompanying drawing by way of example only, wherein:

FIG. 1 is a side elevational view of a shopping cart constructed in accordance with the concepts of the present invention;

FIG. 2 is an enlarged sectional view taken along the plane of line 2—2 in FIG. 1;

FIG. 3 is an enlarged transverse sectional view of a portion of the tread spaced from the wheels;

FIG. 4 is an enlarged transverse sectional view of a portion of the tread taken along the plane of line 4—4 in FIG. 1; and FIG. 5 is an enlarged schematic view of a portion of the tread engaging the edges of the stairs for facilitating movement of the shopping cart up a staircase.

With continuing reference to the accompanying drawings, wherein like reference numerals designate similar parts throughout the various views, reference numeral 10 generally designates a shopping cart constructed in accordance with the concepts of the present invention. The shopping cart 10 includes a chassis 12 having a front axle 14 and a rear 16. The pairs of front wheels 18 are fixedly mounted on the axle 14, while pairs of rear wheels 20 are mounted on the axle 16. The axle 14 is driven by a prime mover in the form of an electric motor 21 supported on the chassis 12, the electric motor being controlled by an off/on switch 22 and being connected through suitable electric conductors 24 to a battery assembly 26 suspended at 28 from the chassis 12.

The wheels 18 and 20 are in the form of sprockets having teeth as indicated at 28. The teeth 28 are adapted to engage within spaced recesses 30 formed in the central portions 32 of a pair of endless treads each generally indicated at 34, which are entrained about the wheels 18 and 20 and extend between the front and rear axles 14 and 16.

The treads 34 have their central portions of a relatively decreased cross sectional area, the size of which is further decreased by the spaced recesses 30. At the opposite edges of the tread there are provided rows of spaced outwardly extending lugs 36, 38, which are rectangular in shape. The treads 34 are stretched tautly over the wheels 18 and 20 in such a manner that the teeth 28 of the sprockets engage within the recesses 30 and the relatively thin and relatively flexible center portion is pushed outwardly with the edges having the rows of lugs 36 and 38 being pulled inwardly toward the center of the wheels 18 and 20 in such a manner that at the location of the wheels 18 and 20, where the tread engages the ground, only the surface 40 of the central portion 22 of the treads will engage the ground with the lugs retracted. The wheels 18 and 20 and the treads may be free wheeling. When it is desired to propel the shopping cart up a staircase or over a curb and with the motor 21 switched on, the rows of lugs 36 will engage the edges S of the stairs, providing means for positively aiding the cart in being drawn up the stairs. However, when the shopping cart is being traversed over a relatively smooth surface, the fact that only the surface 40 engages the ground will provide for a relatively smooth path of travel for the shopping cart with the lugs 36 and 38 serving to prevent skidding or tipping when turning or during other maneuvers. The motor 21 is reversible.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention herein.

I claim:

1. A vehicle comprising a chassis including front and rear axles, pairs of wheels mounted on each of said axles, a prime mover on said chassis connected to one of said axles, resilient endless belt treads, engaged about said wheels and extending between said axles, said treads being substantially wider than said wheels and leaving the edges thereof extending beyond said wheels, the outer surface of said treads having central portions of reduced cross sectional thickness for increasing the flexibility of said treads, said treads having lug means on the edges of the outer surface thereof, at least one of said wheels driving said treads, said treads being tautly stretched over said wheels so that said detents are pulled radially inwardly towards the center of said wheels at the portions of said tread engaged by said wheels whereby only the central portion of said belt treads will engage a surface at the location of the wheels.

2. A vehicle according to claim 1, wherein said vehicle is a shopping cart, and a cage-like body disposed on said chassis.

3. A vehicle according to claim 2, wherein said prime mover is an electric motor, and battery means electrically operatively connected to said motor, said battery means and said motor being detachably connected to said chassis.

4. A vehicle according to claim 3, wherein said wheels are sprockets, said treads having recesses therein for positive engagement with said sprockets.

5. A vehicle according to claim 4, wherein said detents are arranged in spaced relationship in a pair of rows, said detents at locations spaced from said wheels forming stair edge engaging means.

6. A vehicle according to claim 5, wherein said detents are rectangular in shape.

7. A vehicle according to claim 6, including a handle bar secured to said chassis and extending forwardly of said chassis.

References Cited

UNITED STATES PATENTS

| | | | |
|---|---|---|---|
| 2,429,242 | 10/1947 | Slemmons | 305—56 X |
| 2,639,163 | 5/1953 | Walker | 280—47.26 |
| 2,841,407 | 7/1958 | Arnao | 305—35 X |
| 3,149,688 | 9/1964 | Russell | 180—9.22 |

RICHARD J. JOHNSON, *Primary Examiner.*